United States Patent
Sippel et al.

(10) Patent No.: US 11,346,232 B2
(45) Date of Patent: May 31, 2022

(54) TURBINE BLADE WITH ABRADABLE TIP

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 1074 days.

(21) Appl. No.: 15/959,997

(22) Filed: Apr. 23, 2018

(65) Prior Publication Data

US 2019/0323364 A1    Oct. 24, 2019

(51) Int. Cl.
| | |
|---|---|
| *F01D 5/20* | (2006.01) |
| *F01D 5/28* | (2006.01) |
| *F01D 11/08* | (2006.01) |
| *F01D 25/00* | (2006.01) |

(52) U.S. Cl.
CPC .............. *F01D 5/20* (2013.01); *F01D 5/282* (2013.01); *F01D 11/08* (2013.01); *F01D 25/005* (2013.01); *F05D 2220/32* (2013.01); *F05D 2240/11* (2013.01); *F05D 2240/307* (2013.01); *F05D 2300/133* (2013.01); *F05D 2300/175* (2013.01); *F05D 2300/224* (2013.01); *F05D 2300/2261* (2013.01); *F05D 2300/2283* (2013.01); *F05D 2300/6032* (2013.01); *F05D 2300/611* (2013.01)

(58) Field of Classification Search
CPC . F01D 5/20; F01D 5/282; F01D 5/288; F01D 11/08; F01D 11/122; F01D 25/005; F05D 2220/32; F05D 2240/11; F05D 2240/307; F05D 2300/133; F05D 2300/175; F05D 2300/224; F05D 2300/2261; F05D 2300/2283; F05D 2300/6032; F05D 2300/611
See application file for complete search history.

(56) References Cited

U.S. PATENT DOCUMENTS

| | | | |
|---|---|---|---|
| 4,390,320 A | * | 6/1983 | Eiswerth ................ F01D 5/005 29/889.1 |
| 5,932,356 A | | 8/1999 | Sileo et al. |
| 6,234,747 B1 | | 5/2001 | Mielke et al. |
| 6,533,285 B2 | | 3/2003 | Nava et al. |
| 6,541,134 B1 | | 4/2003 | Strangman et al. |
| 6,832,890 B2 | | 12/2004 | Booth |
| 6,887,036 B2 | | 5/2005 | Ohara et al. |
| 6,887,528 B2 | | 5/2005 | Lau et al. |
| 7,114,912 B2 | | 10/2006 | Gerez et al. |
| 7,510,777 B2 | | 3/2009 | Darolia et al. |
| 7,837,446 B2 | | 11/2010 | McMillian |
| 8,172,519 B2 | | 5/2012 | Jarrabet et al. |
| 8,740,572 B2 | * | 6/2014 | Hoebel .................... F01D 5/20 416/241 R |

(Continued)

*Primary Examiner* — David E Sosnowski
*Assistant Examiner* — Aye S Htay
(74) *Attorney, Agent, or Firm* — Barnes & Thornburg LLP (57) ABSTRACT

The present disclosure relates to turbine blades adapted for use in gas turbine engines. In particular, this disclosure is directed to turbine blades that include components made from ceramic matrix composite materials and that incorporate abradable materials.

14 Claims, 4 Drawing Sheets

(56) References Cited

U.S. PATENT DOCUMENTS

| | | |
|---|---|---|
| 8,978,250 B2 | 3/2015 | Barcock et al. |
| 9,133,712 B2 | 9/2015 | Fisk et al. |
| 9,145,250 B2 | 9/2015 | Richardson et al. |
| 9,581,041 B2 | 2/2017 | Sinatra et al. |
| 9,598,973 B2 | 3/2017 | Ghasripoor et al. |
| 9,879,559 B2 | 1/2018 | Fisk et al. |
| 2001/0004436 A1 | 6/2001 | Chasripoor et al. |
| 2001/0052375 A1 | 12/2001 | Sievers et al. |
| 2004/0047726 A1 | 3/2004 | Morrison |
| 2004/0213919 A1 | 10/2004 | Fried |
| 2005/0063827 A1* | 3/2005 | Ochiai ............... C23C 26/00 416/241 R |
| 2005/0129511 A1 | 6/2005 | Allen |
| 2006/0019087 A1 | 1/2006 | Mazzola et al. |
| 2006/0171813 A1 | 8/2006 | Malak et al. |
| 2006/0285972 A1 | 12/2006 | Nicoll et al. |
| 2007/0237667 A1 | 10/2007 | Merrill et al. |
| 2009/0022583 A1* | 1/2009 | Schrey ............... F01D 11/122 415/173.4 |
| 2009/0202355 A1 | 8/2009 | Dierksmeier et al. |
| 2011/0171039 A1* | 7/2011 | Heinz-Schwarzmaier ............ F01D 11/122 416/241 B |
| 2011/0182720 A1 | 7/2011 | Kojima et al. |
| 2012/0195766 A1 | 8/2012 | Cohin et al. |
| 2013/0045091 A1 | 2/2013 | Della-Fera et al. |
| 2014/0147242 A1* | 5/2014 | Ghasripoor ........... F01D 11/122 415/1 |
| 2015/0078900 A1 | 3/2015 | Allen |
| 2015/0192029 A1* | 7/2015 | Roberts, III ............ F01D 5/20 415/173.1 |
| 2015/0267544 A1 | 9/2015 | Santanach et al. |
| 2015/0308276 A1* | 10/2015 | Kleinow ............... F01D 5/141 416/228 |
| 2015/0354373 A1 | 12/2015 | Guo et al. |
| 2016/0003083 A1 | 1/2016 | Delisle et al. |
| 2016/0177745 A1 | 6/2016 | Uskert et al. |
| 2016/0214907 A1 | 7/2016 | Shim et al. |
| 2016/0236995 A1 | 8/2016 | Lai et al. |
| 2016/0237831 A1 | 8/2016 | Strock |
| 2016/0333698 A1 | 11/2016 | Weaver et al. |
| 2017/0016454 A1* | 1/2017 | Strock ................ F04D 29/324 |
| 2017/0254206 A1 | 9/2017 | Schetzel et al. |
| 2017/0254207 A1 | 9/2017 | Schetzel et al. |
| 2017/0362952 A1 | 12/2017 | Stoyanov et al. |
| 2018/0087387 A1* | 3/2018 | Shi ........................ F01D 5/288 |

\* cited by examiner

TURBINE BLADE WITH ABRADABLE TIP

FIELD OF THE DISCLOSURE

The present disclosure relates generally to turbine blades for use in gas turbine engines, and more specifically to turbine blades including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include blades that have ceramic matrix composite material components. Ceramic matrix composite materials are able to withstand very high temperatures, often without active cooling. Manufacture of turbine blades to include ceramic matrix composite materials can present challenges when detailed features of the turbine blades are considered because of material properties and available manufacturing methods that must be taken into account. Accordingly, work on the design of turbine blades including ceramic matrix composites is ongoing.

SUMMARY

The present disclosure may comprise one or more of the following features and combinations thereof.

According to an aspect of the present disclosure, a turbine blade adapted for rotation about a central axis of a gas turbine engine is taught. The turbine blade includes a primary body made from ceramic matrix composite materials and a blade tip that protects materials of the primary body. The primary body may be shaped to provide a root adapted to couple the turbine blade to a disk and an airfoil. The blade tip may extend from the airfoil away from the root and may include a bed of abradable material that extends over at least a portion of the airfoil. The bed of abradable material may be designed to protect ceramic matrix composite materials of the airfoil from rub by structures mounted radially-outward of the blade tip when the turbine blade is rotated during use in the gas turbine engine.

In illustrative embodiments, the blade tip may include a forward retainer that extends from the airfoil away from the root along a leading edge of the airfoil. The forward retainer may provide an axially forward boundary for the bed of abradable material.

In illustrative embodiments, the blade tip may further or alternatively include an aft retainer that extends from the airfoil away from the root along a trailing edge of the airfoil. The aft retainer may provide an axially aft boundary for the bed of abradable material. The forward retainer and/or the aft retainer may be made from ceramic matrix composite materials integral with the airfoil of the primary body.

In illustrative embodiments, the bed of abradable material may form a portion of a pressure side of the blade tip and/or a portion of a suction side of the blade tip. In some embodiments, the bed of abradable material may extend over substantially all of a radially outwardly facing surface of the airfoil.

According to another aspect of the present disclosure, a shrouded turbine blade adapted for rotation about a central axis of a gas turbine engine is taught. The turbine blade of this design may include a primary body made from ceramic matrix composite materials and a blade shroud that extends from the the primary body. The primary body may be shaped to provide a root adapted to couple the turbine blade to a disk and an airfoil shaped to interact with hot gasses in a gas turbine engine and to extract work therefrom. The blade shroud may include a shroud head that extends circumferentially from the airfoil and a bed of abradable material that extends over at least a portion of the shroud head. The bed of abradable material may be configured to protect ceramic matrix composite materials of the shroud head from rub by structures mounted radially-outward of the blade shroud when the turbine blade is rotated during use in the gas turbine engine.

In illustrative embodiments, the shroud head may be made from ceramic matrix composite materials integrally formed with the primary body of the turbine blade. The shroud head may include a shroud wall that extends circumferentially around the central axis from the airfoil, axially forward of the airfoil, and axially aft from the airfoil.

In illustrative embodiments, the shroud head may include a forward retainer that extends from the shroud wall away from the airfoil along a forward edge of the blade shroud. The forward retainer may provide an axially forward boundary for the bed of abradable material.

In illustrative embodiments, the shroud head may include an aft retainer that extends from the shroud wall away from the airfoil along an aft edge of the blade shroud. The aft retainer may provide an axially aft boundary for the bed of abradable material.

In illustrative embodiments, the bed of abradable material may form a portion of a first circumferential side of the blade shroud and/or a portion of a second circumferential side of the blade shroud. In some embodiments, the bed of abradable material may extend over substantially all of a radially outwardly facing surface of the shroud wall.

According to yet another aspect of the present disclosure, a turbine stage adapted for use in a gas turbine engine having a central axis is taught. The turbine stage may include a seal element that extends around the central axis, and a turbine blade adapted for rotation about the central axis.

In illustrative embodiments, the turbine blade may include a primary body made from ceramic matrix composite materials and a blade end member that extends from the primary body. The primary body may be shaped to provide an airfoil shaped to interact with hot gasses in a gas turbine engine and to extract work therefrom. The blade end member may include a bed of abradable material engaged with the seal element to protect ceramic matrix composite materials of the turbine blade from rub by the seal element when the turbine blade is rotated during use in the gas turbine engine.

In illustrative embodiments, the blade end member may be a blade tip that extends from the airfoil away from the central axis. The blade end member may be located within a primary gas path of the turbine stage having a radially outer boundary defined by the seal element. The blade tip may include the bed of abradable material located within the primary gas path that extends over at least a portion of the airfoil to protect ceramic matrix composite materials of the airfoil from rub with the seal element.

In illustrative embodiments, the blade tip may include a forward retainer that extends from the airfoil away from the central axis along a leading edge of the airfoil and/or an aft retainer that extends from the airfoil away from the central axis along a trailing edge of the airfoil.

In illustrative embodiments, the blade end member may be a blade shroud that extends from the airfoil away from the central axis. The blade shroud may include a shroud head that extends circumferentially from the airfoil to define an outer diameter of a primary gas path through the turbine stage and a bed of abradable material that extends over at least a portion of the shroud head. The bed of abradable material may be designed to protect ceramic matrix composite materials of the shroud head from rub by seal element.

In illustrative embodiments, the shroud head includes a shroud wall that extends circumferentially around the central axis from the airfoil. The shroud head may also include a forward retainer that extends from the shroud wall away from the airfoil along a leading edge of the blade shroud and/or an aft retainer that extends from the shroud wall away from the airfoil along a trailing edge of the blade shroud. The forward retainer and/or aft retainers of the shroud head may provide axially forward and/or aft boundaries for the bed of abradable material.

In illustrative embodiments, the seal element may include an abrasive coating that directly engages the bed of abradable material. The abrasive coating may include particles comprising at least one of silicon-carbide, carbon-boron, and silicon-nitride. In illustrative embodiments, the seal element may be made from ceramic matrix composite materials and the particles may be suspended in ytterbium di-silicate as part of an environmental barrier coating. In some embodiments, the seal element is made simply from ceramic matrix composite materials having a coating of ytterbium di-silicate.

In illustrative embodiments, the seal element may be made from metallic materials. The seal element may include an abrasive coating that directly engages the bed of abradable material. The abrasive coating may include particles comprising boron nitride. In some embodiments, the seal element may be made from metallic materials and may include a titanium or MChrAlY coating that directly engages the bed of abradable material.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2:
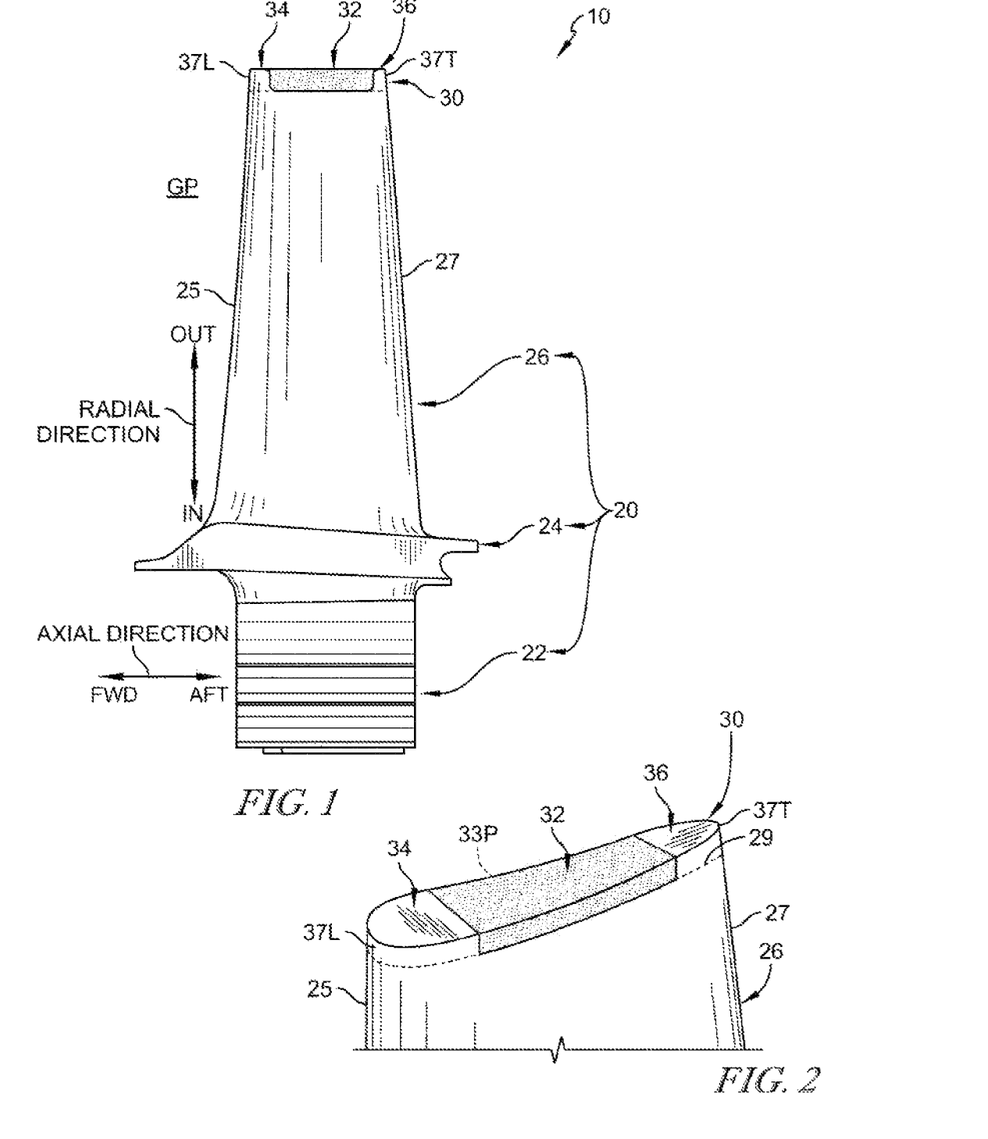
FIG. 1 is a side elevation view of a turbine blade comprising ceramic matrix composite materials showing that the turbine blade includes (from bottom to top) a root adapted to couple the turbine blade to a disk, a platform for blocking hot gasses from moving radially-inward toward the root, an airfoil shaped to interact with hot gasses in a gas turbine engine, and a blade tip including a bed of abradable material configured to be engaged by a seal element for blocking hot gasses from moving radially-outward over the airfoil without interacting with the airfoil.
FIG. 2 is a detailed perspective view of the blade tip included in the turbine blade of FIG. 1 showing that the blade tip includes forward and aft retainers that bound the bed of abradable material.

A turbine blade 10 according to the present disclosure includes a primary body 20 and a blade tip 30 with a bed of abradable material 32 as shown, for example, in FIGS. 1 and 2. The primary body 20 and portions of the blade tip 30 of the turbine blade 10 are made from ceramic matrix composite materials that are suitable for use in high temperature environments, like the primary gas path GP of a gas turbine engine. However, exposure of the constituent parts of the ceramic matrix composite materials in the turbine blade 10 to the primary gas path GP via rubbing with other engine parts can lead to degradation of the materials. Accordingly, the bed of abradable material 32 included in the blade tip 30 is arranged to interface with other parts of the engine that might rub the turbine blade 10 during use as suggested in FIGS. 3 and 4.

The turbine blade 10 of the present disclosure is adapted for rotation about a central axis of a gas turbine engine so as to drive rotation of other components within the engine. The turbine blade 10 includes the primary body 20 and the blade tip 30 as shown in FIGS. 1 and 2. The primary body 20 is shaped to provide a root 22, a platform 24, and an airfoil 26. The blade tip 30 extends radially outwardly from the airfoil 26 and protects the radially-outer end of the airfoil 26 from rub damage during use in an engine.

Figure 3:
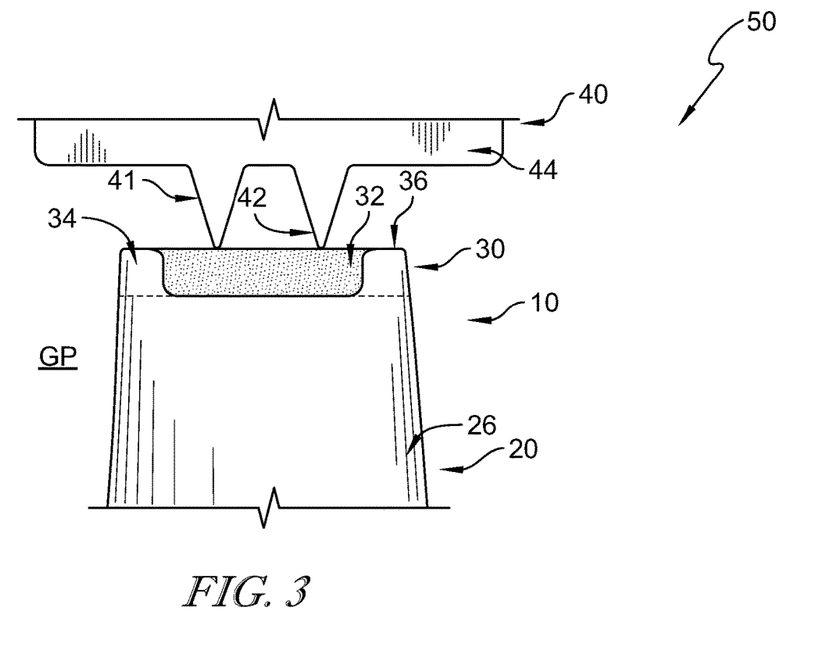
FIG. 3 is a side elevation view of the blade tip included in the turbine blade of FIG. 1 with a seal element including a pair of knife seals arranged to engage the bed of abradable material upon use of the turbine blade in a gas turbine engine showing that the bed of abradable material is adapted to protect ceramic matrix composite materials in the airfoil from being rubbed by the knife seals of the seal element.
Figure 4:
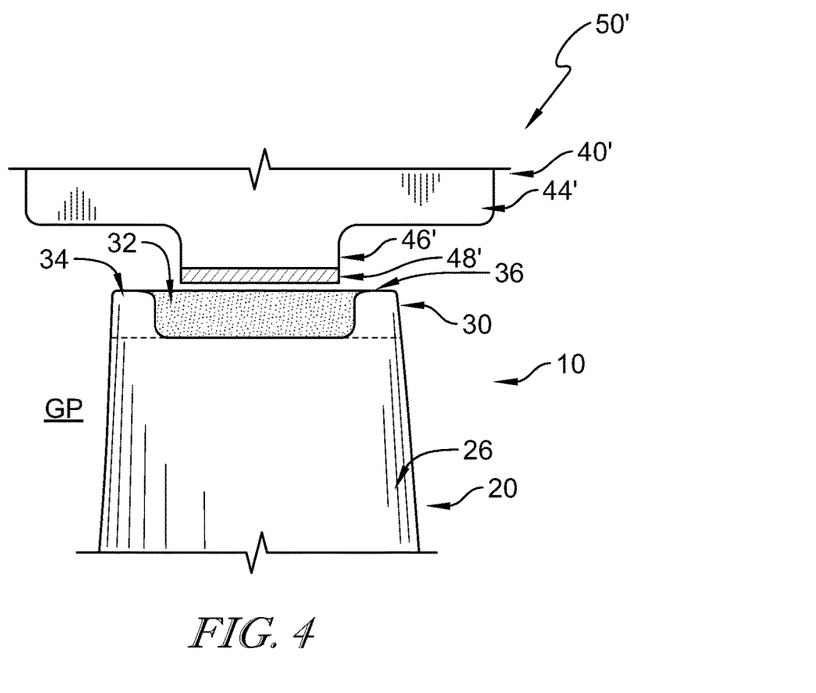
FIG. 4 is a side elevation view of the blade tip included in the turbine blade of FIG. 1 with a seal element including a seal runner with an abrasive layer arranged to engage the bed of abradable material upon use of the turbine blade in a gas turbine engine showing that the bed of abradable material is adapted to protect ceramic matrix composite materials in the airfoil from being rubbed by the abrasive later of the seal element.

The blade tip 30, sometimes called a blade end member, is adapted to engage a seal element 40, 40' included in a corresponding turbine stage 50, 50' during rotation of the turbine blade 10 in a gas turbine engine as suggested in FIGS. 3 and 4. Thus, the blade tip 30 protects the primary body 20 of the turbine blade 10 from rubbing the seal element 40, 40' such that ceramic matrix composite materials of the primary body 20 are kept intact.

The blade tip 30 is airfoil shaped and is arranged in the primary gas path GP as shown in the drawings. The blade tip 30 includes the bed of abradable material 32, a forward retainer 34, and an aft retainer 36 as shown in FIGS. 1-4. The bed of abradable material 32 extends over a portion of a radially-outwardly facing surface 29 of the airfoil 26 to protect ceramic matrix composite materials of the airfoil 26. The forward retainer 34 is made from ceramic matrix composite materials integral with the airfoil 26 and extends radially-outward from the airfoil 26 (away from the root 22 and the platform 24) along a leading edge 25 of the airfoil 26. The aft retainer 36 is made from ceramic matrix composite materials integral with the airfoil 26 and extends radially-outward from the airfoil 26 (away from the root 22 and the platform 24) along a trailing edge 27 of the airfoil 26.

The bed of abradable material 32 may be made from ceramic matrix composite with chopped fibers. Of course, other suitable materials can be used. In general, the bed of abradable material 32 may be characterized in that it is more abradable (or softer) than the ceramic matrix composite materials of the primary body 20 and the forward/aft retainers 34, 36. In the illustrated embodiment, the ceramic matrix composite materials included in the bed of abradable material 32 is more porous than the surrounding materials to provide abradability. In the illustrative embodiment, the bed of abradable material 32 is coupled to the surrounding ceramic matrix composite materials by ceramic matrix material.

In the illustrative embodiment, the bed of abradable material 32 is exposed to the primary gas path GP as suggested in FIGS. 3 and 4. The bed 32 extends circumferentially all the way across the blade tip 30 and provides portions of both a pressure side 33P and a suction side 33S of the blade tip 30. In some embodiments, the forward and/or aft retainers 34, 36 may be omitted and the bed of abradable material 32 can extend over additional (or all) of the radially-outer surface 29 of the airfoil 26 as suggested in phantom line.

The forward retainer 34 provides an axially forward boundary for the bed of abradable material 32 as shown in FIGS. 1 and 2. The interface between the forward retainer 34 and the bed of abradable material 32 is illustratively entirely radially-extending such that the connection between the forward retainer 34 and the bed of abradable material 32 is generally in shear when the turbine blade 10 is rotated about the central axis. In other embodiments, at least a portion of the interface between the forward retainer 34 and the bed of abradable material 32 is radially-extending so as to have a shear component upon rotation of the turbine blade 10. This shear interface can be helpful in retaining the bed of abradable material 32 as part of the turbine blade 10. In the illustrative embodiment, the forward retainer 34 provides a leading edge 37L of the blade tip 30.

The aft retainer 36 provides an axially aft boundary for the bed of abradable material 32 as shown in FIGS. 1 and 2. The interface between the aft retainer 36 and the bed of abradable material 32 is illustratively entirely radially-extending such that the connection between the aft retainer 36 and the bed of abradable material 32 is generally in shear when the turbine blade 10 is rotated about the central axis. In other embodiments, at least a portion of the interface between the aft retainer 36 and the bed of abradable material 32 is radially-extending so as to have a shear component upon rotation of the turbine blade 10. This shear interface can be helpful in retaining the bed of abradable material 32 as part of the turbine blade 10. In the illustrative embodiment, the aft retainer 36 provides a trailing edge 37T of the blade tip 30.

As noted above, the primary body 20 of the turbine blade 10 along with the forward and aft retainers 34, 36 of the blade tip 30 are integrally formed from ceramic matrix composite materials as shown in FIGS. 1 and 2. For purposes of this application, integration means that these components are of one-piece construction with ceramic-containing reinforcements that are co-infiltrated with ceramic-containing matrix material. For example, the primary body 20 of the turbine blade 10 along with the forward and aft retainers 34, 36 of the blade tip 30 may be of one-piece silicon-carbide/silicon-carbide ceramic matrix composite construction. Of course other materials and constructions are contemplated.

As noted above, a turbine stage 50 according to the present disclosure can include both the turbine blade 10 and a seal element 40 as shown in FIG. 3. The seal element 40 is illustratively ceramic matrix composite material and is formed to include knife seals 41, 42 that extend radially inwardly from a band 44. In other embodiments, the seal element may be made of metallic materials. The knife seals 41, 42 engage the bed of abradable material 32 included in the turbine blade 10 to form a seal between stationary and rotating components in the turbine stage 50.

Figure 7:
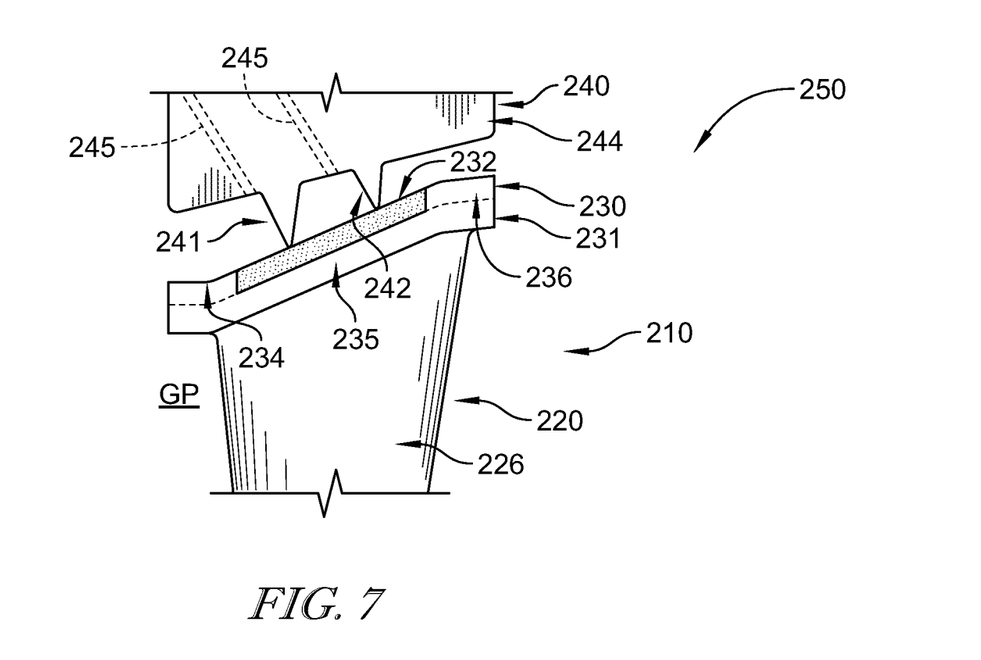
FIG. 7 is a side elevation view of the blade shroud included in the turbine blade of FIG. 5 with a seal element including a pair of knife seals arranged to engage the bed of abradable material upon use of the turbine blade in a gas turbine engine showing that the bed of abradable material is adapted to protect ceramic matrix composite materials in the blade shroud from being rubbed by the knife seals of the seal element.
Figure 8:
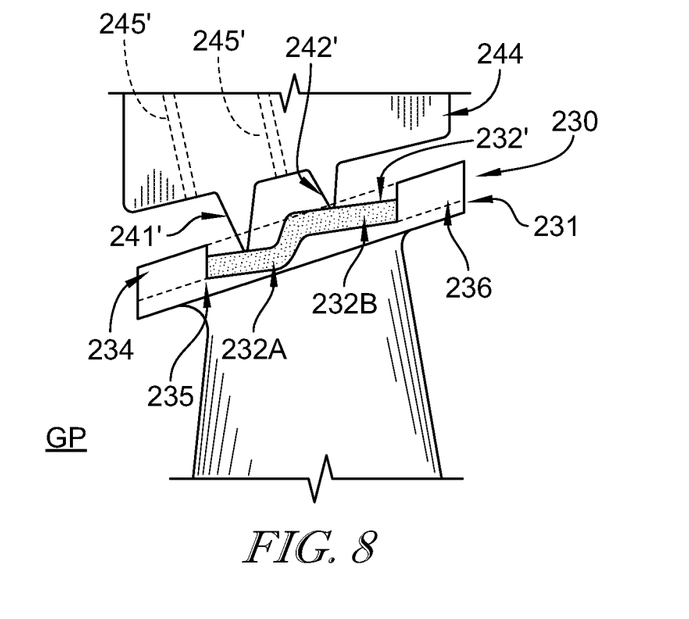
FIG. 8 is a side elevation view of an alternative blade shroud adapted for use in the turbine blade of FIG. 5 with a seal element including a pair of knife seals arranged to engage the bed of abradable material showing that the bed of abradable material is shaped to provide radially spaced apart landings that step outward from one another and showing that cooling air holes may be formed in the seal element and shaped to direct cooling air onto the knife seals to dissipate heat generated when the knife seals engage the bed of abradable material.

Cooling features/holes like those shown in FIGS. 7 and 8 may be incorporated into the band 44 to discharge air onto the knife seals 41, 42 to dissipate friction heat generated. The primary gas path GP of the turbine stage 50 has a radially-outer boundary defined by the band 44 of the seal element 40 and a radially-inner boundary defined by the platform 24 of the primary body 20 included in the turbine blade 10.

The knife seals 41, 42 of the seal element 40 are manufactured to be harder than the bed of abradable material 30 so as to cut into the bed of abradable material 30 upon rub in or kissing during operation. In illustrative embodiments, the knife seals 41, 42 include a coating of fully densified environmental barrier coating. Such a coating may be made from ytterbium di-silicate or other suitable materials. This or other coatings applied to the knife seals 41, 42 may be applied via additive layer manufacturing (ALM), direct laser deposition (DLD), electron beam physical vapor deposition (EPBVD), plasma spray physical deposition (PSPD), solution gel, or brazing. Coating applied to the knife seals 41, 42 may include abrasive particulate.

Coating applied to the knife seals 41, 42 may include abrasive particulate/particles. The abrasive particles used in the knife seals 41, 42 may be silicon-carbide (SiC), carbon-boron (C—BN), and silicon-nitride (SiN). In other embodiments, other types of particle may be used. Each particle may have an exemplary diameter of between about, or precisely, 0.002-0.0065 inches, average size (50-165 micrometers) to provide about 80 and 230 grit. In other embodiments, particles may have an exemplary diameter of between about, or precisely, 0.0004-0.0118 inches, average size (10-300 micrometers). However, other sizes of particle are contemplated.

In embodiments in which the seal element 40 is made from metallic materials, the knife seals 41, 42 may have abrasive coatings and/or tips applied. For example, a titanium or MChrAlY coating may be applied via the various methods described above as would be suitable for a particular coating type. In some such embodiments, particles of boron nitride may be included in the coating to provide abrasive elements.

An alternative turbine stage 50' incorporating the turbine blade 10 of FIGS. 1-3 is shown in FIG. 4. In the alternative turbine stage 50', a different seal element 40' is used in place of seal element 40. Seal element 40' includes a seal runner 46' with an abrasive layer 48' arranged to engage the bed of abradable material 32 included in the blade 10. The seal runner 46' extends radially inward from a band 44' and forms a seal between stationary and rotating components in the turbine stage 50' when engaged with the bed 32. Cooling features/holes like those shown in FIGS. 7 and 8 may be incorporated into the band 44' to discharge air onto the runner 42' to dissipate friction heat generated.

In embodiments where the seal element 40' is made from ceramic matrix composite materials, the abrasive layer 48' may include be provided by a coating of fully densified environmental barrier coating. Such a coating may be made from ytterbium di-silicate or other suitable materials. This or other coatings applied to the seal element 40' may be applied via additive layer manufacturing (ALM), direct laser deposition (DLD), electron beam physical vapor deposition (EPBVD), plasma spray physical deposition (PSPD), solution gel, or brazing. Coating applied to the seal element 40' may include abrasive particulate as further described below.

In embodiments in which the seal element 40' is made from metallic materials, the abrasive layer 40' may include abrasive coatings. For example, a titanium or MChrAlY coating may be applied via the various methods described above as would be suitable for a particular coating type.

Coating applied to the seal element 40' may include abrasive particulate/particles. The abrasive particles may be silicon-carbide (SiC), carbon-boron (C—BN), and silicon-nitride (SiN). In other embodiments, other types of particle may be used. Each particle may have an exemplary diameter of between about, or precisely, 0.002-0.0065 inches, average size (50-165 micrometers) to provide about 80 and 230 grit. In other embodiments, particles may have an exemplary diameter of between about, or precisely, 0.0004-0.0118 inches, average size (10-300 micrometers). However, other sizes of particle are contemplated.

Turning back to the primary body 20 of the turbine blade 10, the root 22 of the primary body 20 is adapted to couple the turbine blade 10 to a disk (not shown). Illustratively, the root 22 has a fir-tree shape but in other embodiments may have a dove-tail shaped, apertures for fastener coupling, or may have any other suitable shape with features for coupling directly or indirectly to a disk.

The platform 24 of the primary body 20 included in the turbine blade 10 is arranged radially between the root 22 and the airfoil 26 as shown in FIG. 1. The platform 24 extends circumferentially and axially from the airfoil 26 to provide the radially-inner boundary of the primary gas path GP such that hot gasses do not move inward from the primary gas path into contact with the root 22 or disk.

The airfoil 26 is shaped to interact with hot gasses discharged from a combustor in an associated gas turbine engine and to extract work therefrom. The airfoil 26 is illustratively of solid construction enabled by the high temperature capability of the ceramic matrix composite materials. However, in other embodiments, the airfoil 26 may be actively cooled via internal channels supplied with cooling air.

Figures 5, 6:
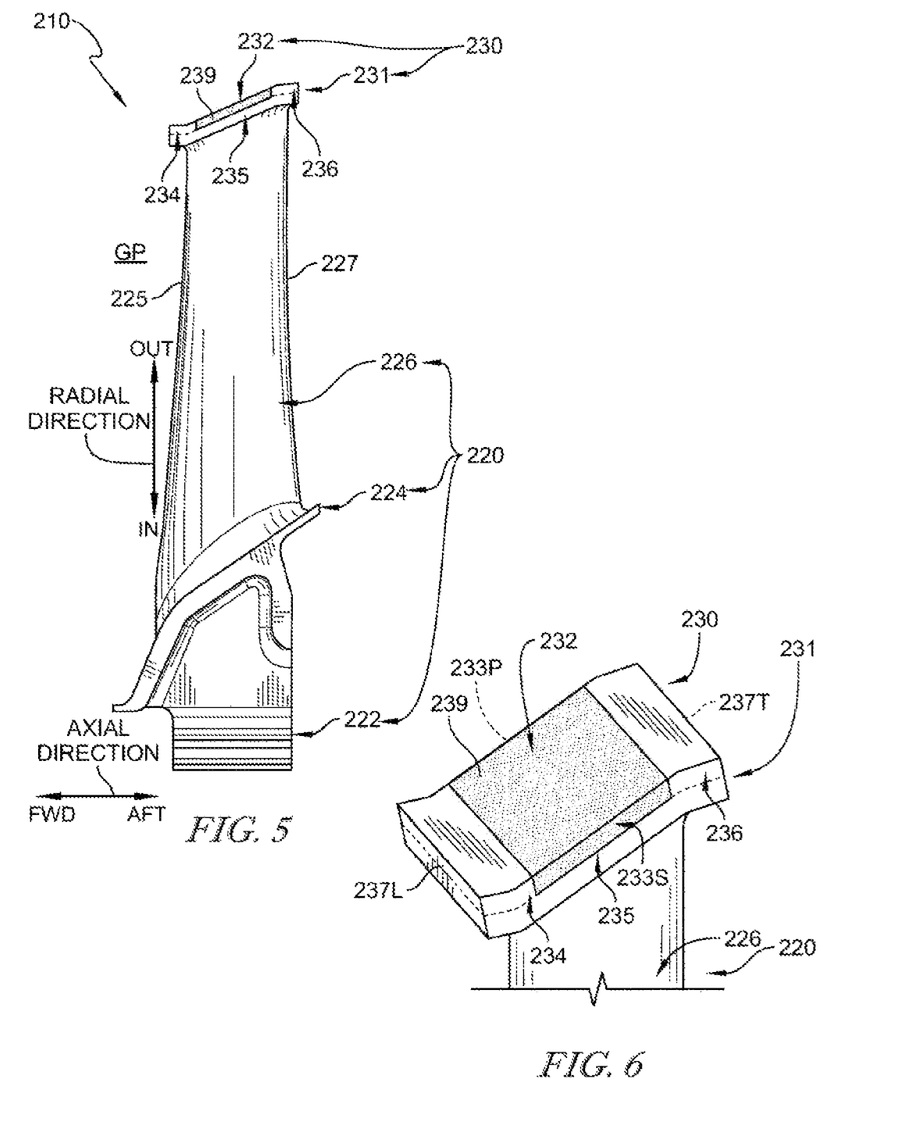
FIG. 5 is a side elevation view of a second turbine blade comprising ceramic matrix composite materials showing that the turbine blade includes (from bottom to top) a root adapted to couple the turbine blade to a disk, a platform for blocking hot gasses from moving radially-inward toward the root, an airfoil shaped to interact with hot gasses in a gas turbine engine, and a blade shroud including a bed of abradable material configured to be engaged by a seal element for blocking hot gasses from moving radially-outward over the airfoil without interacting with the airfoil.
FIG. 6 is a detailed perspective view of the blade shroud included in the turbine blade of FIG. 5 showing that the blade shroud includes forward and aft retainers that bound the bed of abradable material.

A second turbine blade 210 in accordance with the present disclosure is shown in FIGS. 5-7. The turbine blade 210 includes a primary body 220 and a blade shroud 230 with a bed of abradable material 232. The primary body 220 and portions of the blade shroud 230 of the turbine blade 210 are made from ceramic matrix composite materials that are suitable for use in high temperature environments, like the primary gas path GP of a gas turbine engine. However, exposure of the constituent parts of the ceramic matrix composite materials in the turbine blade 210 to the primary gas path GP via rubbing with other engine parts can lead to degradation of the materials. Accordingly, the bed of abradable material 232 included in the blade shroud 230 is arranged to interface with other parts of the engine that might rub the turbine blade 210 during use as suggested in FIG. 7.

The turbine blade 210 of the present disclosure is adapted for rotation about a central axis of a gas turbine engine so as to drive rotation of other components within the engine. The turbine blade 210 includes the primary body 220 and the blade shroud 230 as shown in FIGS. 5 and 6. The primary body 220 is shaped to provide a root 222, a platform 224, and an airfoil 226. The blade shroud 230 extends radially outwardly from the airfoil 226.

The bed of abradable material 232 in the blade shroud 230 is adapted to engage a seal element 240 included in a corresponding turbine stage 250 during rotation of the turbine blade 210 in a gas turbine engine as suggested in FIG. 7. Thus, the bed of abradable material 232 protects the blade shroud 230 and the primary body 20 of the turbine blade 210 from rubbing the seal element 240 such that ceramic matrix composite materials of the components are kept intact.

The blade shroud 230, sometimes called a blade end member, extends circumferentially around the central axis from the airfoil 226, axially forward of the airfoil 226, and axially aft from the airfoil 226 so as to define a radially-outer boundary of a primary gas path GP. The blade shroud 230 includes a shroud head 231 and the bed of abradable material 232. The shroud head 231 is integrally formed from ceramic matrix composite materials along with the primary body 220 of the turbine blade. The bed of abradable material 232 is received in a radially-outwardly opening channel 239 defined by the shroud head 231.

The shroud head 231 is shaped to include a forward retainer 234, a shroud wall 235, and an aft retainer 236 as shown in FIGS. 5 and 6. The retainers 234, 236 and the shroud wall 235 cooperate to define the circumferentially extending channel 239 that receives the bed of abradable material 232. The shroud wall 235 extends circumferentially around the central axis from the airfoil 226, axially forward of the airfoil 226, and axially aft from the airfoil 226. The forward retainer 234 extends from the shroud wall 235 radially away from the central axis along a forward edge 237L of the blade shroud 230. The aft retainer 236 extends from the shroud wall 235 radially-outward from the shroud wall 235 along an aft edge 237T of the blade shroud 230.

The bed of abradable material 232 may be made from ceramic matrix composite with chopped fibers. Of course, other suitable materials can be used. In general, the bed of abradable material 232 may be characterized in that it is more abradable (or softer) than the ceramic matrix composite materials of the primary body 220, the shroud wall 235, and the forward/aft retainers 234, 236. In the illustrated embodiment, the ceramic matrix composite materials included in the bed of abradable material 232 is more porous than the surrounding materials to provide abradability. In the illustrative embodiment, the bed of abradable material 232 is coupled to the surrounding ceramic matrix composite materials by ceramic matrix material.

In the illustrative embodiment, the bed of abradable material 232 is shielded from the primary gas path GP. The bed 232 extends circumferentially all the way across the blade shroud 230 and provides portions of both a first circumferential side 233P and a second circumferential side 233S of the blade shroud 230. In some embodiments, the forward and/or aft retainers 234, 236 may be omitted and the bed of abradable material 232 can extend over additional (or all) of the radially-outer surface 229 of the shroud wall 235 as suggested in phantom line.

The forward retainer 234 provides an axially forward boundary for the bed of abradable material 232 as shown in FIGS. 5 and 6. The interface between the forward retainer 234 and the bed of abradable material 232 is illustratively entirely radially-extending such that the connection between the forward retainer 234 and the bed of abradable material 232 is generally in shear when the turbine blade 210 is rotated about the central axis. In other embodiments, at least a portion of the interface between the forward retainer 234 and the bed of abradable material 232 is radially-extending so as to have a shear component upon rotation of the turbine blade 210. This shear interface can be helpful in retaining the bed of abradable material 232 as part of the turbine blade 210.

The aft retainer 236 provides an axially aft boundary for the bed of abradable material 232 as shown in FIGS. 5 and 6. The interface between the aft retainer 236 and the bed of abradable material 232 is illustratively entirely radially-extending such that the connection between the aft retainer 236 and the bed of abradable material 232 is generally in shear when the turbine blade 210 is rotated about the central axis. In other embodiments, at least a portion of the interface between the aft retainer 236 and the bed of abradable material 232 is radially-extending so as to have a shear component upon rotation of the turbine blade 210. This shear interface can be helpful in retaining the bed of abradable material 232 as part of the turbine blade 210.

As noted above, the primary body 220 of the turbine blade 210 along with the shroud head 231 of the blade shroud 230 are integrally formed from ceramic matrix composite materials as shown in FIGS. 5 and 6. For purposes of this application, integration means that these components are of one-piece construction with ceramic-containing reinforcements that are co-infiltrated with ceramic-containing matrix material. For example, the primary body 220 of the turbine blade 210 along with the shroud head 231 may be of one-piece silicon-carbide/silicon-carbide ceramic matrix composite construction. Of course other materials and constructions are contemplated.

A turbine stage 250 according to the present disclosure can include both the turbine blade 210 and a seal element 240 as shown in FIG. 7. The seal element 240 includes knife seals 241, 242 that extend radially inwardly from a band 244. The knife seals 241, 242 engage the bed of abradable material 232 included in the blade shroud 230 of the turbine blade 210 to form a seal between stationary and rotating components in the turbine stage 250.

The knife seals 241, 242 of the seal element 240 are manufactured to be harder than the bed of abradable material 230 so as to cut into the bed of abradable material 230 upon rub in or kissing during operation. In illustrative embodiments, the knife seals 241, 242 include a coating of fully densified environmental barrier coating. Such a coating may be made from ytterbium di-silicate or other suitable materials. This or other coatings applied to the knife seals 241, 242 may be applied via additive layer manufacturing (ALM), direct laser deposition (DLD), electron beam physical vapor deposition (EPBVD), plasma spray physical deposition (PSPD), solution gel, or brazing. Coating applied to the knife seals 241, 242 may include abrasive particulate.

Coating applied to the knife seals 241, 242 may include abrasive particulate/particles. The abrasive particles used in the knife seals 241, 242 may be silicon-carbide (SiC), carbon-boron (C—BN), and silicon-nitride (SiN). In other embodiments, other types of particle may be used. Each particle may have an exemplary diameter of between about, or precisely, 0.002-0.0065 inches, average size (50-165 micrometers) to provide about 80 and 230 grit. In other embodiments, particles may have an exemplary diameter of between about, or precisely, 0.0004-0.0118 inches, average size (10-300 micrometers). However, other sizes of particle are contemplated.

In embodiments in which the seal element 240 is made from metallic materials, the knife seals 241, 242 may have abrasive coatings and/or tips applied. For example, a titanium or MChrAlY coating may be applied via the various methods described above as would be suitable for a particular coating type. In some such embodiments, particles of boron nitride may be included in the coating to provide abrasive elements.

In the illustrated embodiment, the bed of abradable material 232 has a frustoconical shape as suggested in FIG. 7 with a smooth transition as it extends aft along the shroud head 231. In an optional embodiment, the bed of abradable material 232' may have steps 232A', 232B' that each provide a cylindrical land for a corresponding knife seal 241', 242' as shown in FIG. 8. In either configuration, the seal element 240 may include optional cooling air channels 245, 245' configured to discharge cooling air onto the knife seals and dissipate heat generated by friction.

The primary gas path GP of the turbine stage 250 has a radially-outer boundary defined by the radially-inner face of blade shroud 230 included in the turbine blade 210. Accordingly, the bed of abradable material 232 is shielded from direct interaction with the materials in the gas path GP. In addition, the primary gas path GP of the turbine stage 250 has a radially-inner boundary defined by the platform 224 of the turbine blade 210.

Turning back to the primary body 220 of the turbine blade 210, the root 222 of the primary body 220 is adapted to couple the turbine blade 210 to a disk (not shown). Illustratively, the root 222 has a fir-tree shape but in other embodiments may have a dove-tail shaped, apertures for fastener coupling, or may have any other suitable shape with features for coupling directly or indirectly to a disk.

The platform 224 of the primary body 220 included in the turbine blade 210 is arranged radially between the root 222 and the airfoil 226 as shown in FIG. 5. The platform 224 extends circumferentially and axially from the airfoil 226 to provide the radially-inner boundary of the primary gas path GP such that hot gasses do not move inward from the primary gas path into contact with the root 222 or disk.

The airfoil 226 is shaped to interact with hot gasses discharged from a combustor in an associated gas turbine engine and to extract work therefrom. The airfoil 226 is illustratively of solid construction enabled by the high temperature capability of the ceramic matrix composite materials. However, in other embodiments, the airfoil 226 may be actively cooled via internal channels supplied with cooling air.

It is noted that radial directions described throughout this description relate to a central axis of an associated gas turbine engine. While the central axis is not shown, it is understood to extend left to right under the root of the airfoils shown in FIGS. 1 and 5. Moreover, arrows indicating radial and axial direction are annotated onto FIGS. 1 and 5 to support understanding of the present disclosure.

It is appreciated that turbine blades present an area where benefit exists for implementing ceramic matrix composite materials (CMCs) in gas turbine engines. In addition to the CMCs being capable of operating at higher temperatures that can deliver cooling air savings/specific fuel consumption reductions to the engine system, the weight reductions provided over a metallic blade system can be significant. Not only are ceramic matrix composite-containing blades lighter, but these savings are multiplied since the size and weight of the disks could also be reduced.

In order for a ceramic matrix composite blade to meet all of its functional requirements, it must be capable of running at managed tip clearance to the related stator structure (seal segments). The turbine will likely be more efficient with a tighter tip clearance. The systems with the lowest tip clearances typically involve a rub system where the rotor/blades rub into the outer static structure. The present application describes the incorporation of the abradable portion of a rub system to exist on the rotating blades.

A first envisioned embodiment is shown in FIGS. 1-4. Here an abradable layer is included in the tips of the ceramic matrix composite blade and cutting elements are included in seal segments adjacent to the blade as shown in FIG. 3. The figure shows the coating contained forward and aft by structural ceramic matrix composite blade material. It is further envisioned that the cearamic matrix composite blade may have a flat top with the abradable included across the entire top surface the blade.

Another embodiment is shown in FIGS. 5-8, in which a shroud/winglet of a turbine blade incorporates an abradable tip.

Various cutting features (seal elements) can be used as part of the static structure as shown in FIGS. 3 and 4. Configurations like that in FIG. 4 may be used with the squealer tip style blades having abradable tips to prevent air flowing from the pressure side to the suction side between knife seals While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade adapted for rotation about a central axis of a gas turbine engine, the turbine blade comprising
   a primary body made from ceramic matrix composite materials, the primary body shaped to provide a root adapted to couple the turbine blade to a disk and shaped as an airfoil having a pressure side and a suction side opposite the pressure side, the primary body configured to interact with hot gasses in the gas turbine engine and to extract work therefrom, and
   a blade tip that extends from a radially-outwardly facing surface of the primary body away from the root, the blade tip including a bed of abradable material that extends over and radially-outwardly away from at least a portion of the radially-outwardly facing surface of the primary body to protect ceramic matrix composite materials of the primary body from rub by structures mounted radially-outward of the blade tip when the turbine blade is rotated during use in the gas turbine engine,
   wherein the blade tip further includes a forward retainer that extends radially-outwardly away from the radially-outwardly facing surface of the primary body along a leading edge of the primary body and that delimits a forward side of the bed of abradable material,
   wherein the blade tip further includes an aft retainer that extends radially-outwardly away from the radially-outwardly facing surface of the primary body along a trailing edge of the primary body and that delimits an aft side of the bed of abradable material, and
   wherein a first side of the bed of abradable material is flush with the pressure side of the primary body such that the first side forms a portion of the pressure side of the primary body and a second side of the bed of abradable material opposite the first side is flush with the suction side of the primary body such that the second side forms a portion of the suction side of the primary body.

2. The turbine blade of claim 1, wherein the forward retainer is made from ceramic matrix composite materials integral with the airfoil of the primary body.

3. The turbine blade of claim 2, wherein the aft retainer is made from ceramic matrix composite materials integral with the airfoil of the primary body.

4. The turbine blade of claim 1, wherein the bed of abradable material extends over all of the radially-outwardly facing surface of the airfoil between the forward retainer and the aft retainer.

5. The turbine blade of claim 1, wherein a top surface of the bed of abradable material is flush with a top surface of the forward retainer and with a top surface of the aft retainer.

6. The turbine blade of claim 1, wherein the bed of abradable material extends circumferentially all the way across the radially-outwardly facing surface of the airfoil.

7. A turbine stage adapted for use in a gas turbine engine having a central axis, the turbine stage comprising
   a seal element that extends around the central axis, and
   a turbine blade adapted for rotation about the central axis, the turbine blade including
      a primary body made from ceramic matrix composite materials, the primary body shaped as an airfoil having a pressure side and a suction side opposite the pressure side, the primary body configured to interact with hot gasses in the gas turbine engine and to extract work therefrom, and
      a blade end member that extends from a radially-outwardly facing surface of the primary body away from the root, the blade end member including a bed of abradable material that extends over and radially-outwardly away from at least a portion of the radially-outwardly facing surface of the primary body and engaged with the seal element to protect ceramic matrix composite materials of the turbine blade from rub by the seal element when the turbine blade is rotated during use in the gas turbine engine, wherein the blade end member further includes a forward retainer that extends radially-outwardly away from the radially-outwardly facing surface of the primary body along a leading edge of the primary body and that delimits a forward side of the bed of abradable material, wherein the blade end member further includes an aft retainer that extends radially-outwardly away from the radially-outwardly facing surface of the primary body along a trailing edge of the primary body and that delimits an aft side of the bed of abradable material, and wherein a first side of the bed of abradable material is flush with the pressure side of the primary body such that the first side forms a portion of the pressure side of the primary body and a second side of the bed of abradable material opposite the first side is flush with the suction side of the primary body such that the second side forms a portion of the suction side of the primary body.

8. The turbine stage of claim 7, wherein the blade end member is a blade tip that extends from the airfoil away from the central axis within a primary gas path of the turbine stage having a radially outer boundary defined by the seal element, the blade tip including the bed of abradable material located within the primary gas path that extends over at least a portion of the airfoil to protect ceramic matrix composite materials of the airfoil from rub with the seal element.

9. The turbine stage of claim 7, wherein the seal element includes an abrasive coating that directly engages the bed of abradable material; and the abrasive coating includes particles comprising at least one of silicon-carbide, carbon-boron, and silicon-nitride.

10. The turbine stage of claim 9, wherein the seal element is made from ceramic matrix composite materials and the particles are suspended in ytterbium di-silicate.

11. The turbine stage of claim 7, wherein the seal element is made from ceramic matrix composite materials having a coating of ytterbium di-silicate as part of an environmental barrier coating.

12. The turbine stage of claim 7, wherein the seal element is made from metallic materials and includes an abrasive coating that directly engages the bed of abradable material; and the abrasive coating includes particles comprising boron nitride.

13. The turbine stage of claim 7, wherein the seal element is made from metallic materials and includes a titanium or MCrAlY coating that directly engages the bed of abradable material.

14. The turbine blade of claim 7, wherein a top surface of the bed of abradable material is flush with a top surface of the forward retainer and with a top surface of the aft retainer.

* * * * *